United States Patent Office 3,129,227
Patented Apr. 14, 1964

3,129,227
CERTAIN 1,3-BIS(HETEROCYCLYLIMINO)-
ISOINDOLINES
Daniël van Velzen, Amsterdam, Netherlands, assignor to Shell Oil Company, New York, N.Y., a corporation of Delaware
No Drawing. Filed Feb. 21, 1962, Ser. No. 174,678
Claims priority, application Netherlands Aug. 3, 1961
2 Claims. (Cl. 260—306.8)

This invention relates to new compositions of matter and to a method for their preparation. More particularly, the present invention relates to N-substituted isoindoline compounds in which the imino nitrogen substituents are monovalent heterocyclic radicals and to a process for the manufacture of such compounds.

Isoindoline derivatives in which the imino nitrogen atoms are attached to methyl, ethyl or phenyl groups are known. However, isoindoline derivatives in which the imino nitrogen atoms are bound to heterocyclic radicals cannot be prepared by the same methods which are used to prepare the methyl, ethyl and phenyl-substituted isoindoline derivatives.

It is an object of the present invention to provide new imino-substituted isoindoline derivatives. A further object of the invention is to provide an efficient and convenient process for the preparation of such compounds. Other objects of the invention will appear hereinafter.

It has now been discovered that these and other objects may be accomplished by the liquid phase reaction of a heterocyclic primary amine and an aromatic dinitrile compound. Thus, according to the present invention, the aromatic dinitrile and heterocyclic primary amine are reacted together in the molten state.

The reaction by which the novel compounds of the present invention are prepared may be represented by the following equation:

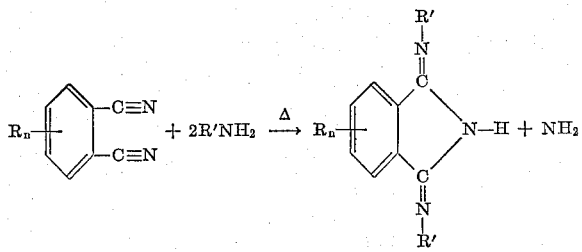

wherein $n$ is an integer from 0 to 4, inclusive (preferably 0 to 2), R' is a heterocyclic nitrogen-containing radical and each R is a lower alkyl group of from 1 to 4 carbon atoms (preferably methyl or ethyl), or a divalent carbon chain bridging two adjacent carbon atoms on the aromatic nucleus. When R is a divalent carbon chain connecting adjacent ring carbon atoms, R may be an alkylene chain of four chain carbon atoms or an unsaturated divalent carbon chain with up to four carbon atoms forming the chain. Thus, dinitriles containing a naphthalene nucleus or an alkyl-substituted naphthalene nucleus may be used. In this reaction the heterocyclic moiety R' is preferably a heterocyclic ring which contains a carbon-nitrogen double bond (C=N) in a five- or six-membered ring. The heterocyclic ring may contain other hetero atoms (such as oxygen or sulfur) in addition to nitrogen. Amino-substituted thiazoles such as 2-aminothiazole and amino-substituted isothiazoles may be reacted with dinitriles according to the process of the present invention. More than one nitrogen atom may be present in the heterocyclic ring such as in the compound histamine. Amino-substituted oxazoles and isooxazoles may also be used. The heterocyclic ring may contain substituents such as an alkyl group of from 1 to 6 carbon atoms (preferably a lower alkyl group of from 1 to 4 carbon atoms) or the heterocyclic ring may be condensed with a benzene ring. Thus, compounds such as alkyl-substituted quinoline (2-methyl-4-ethyl-quinoline, for example) may be employed in the present reaction. Unsubstituted phthalodinitrile or alkyl-substituted phthalodinitrile derivatives having a methyl or ethyl group in the ortho or para position with respect to one of the nitrile groups form a particularly suitable subclass of reactants.

The novel compounds of the present invention may be described as 1,3-heterocyclic imino-isoindoline compounds of 8 to 35 carbon atoms in which the heterocyclic moiety contains from 5 to 6 ring atoms with at least one carbon-nitrogen double bond, and, when the heterocyclic ring contains 6 ring atoms, at least two hetero atoms are in the ring, the second hetero atom being selected from the group consisting of nitrogen, oxygen, and sulfur. Thus, the compounds of the present invention may be represented by the formula:

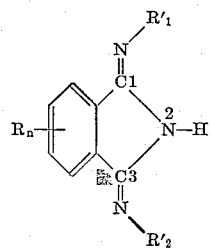

wherein $n$ is an integer from 0 to 4, inclusive, and represents the number of substituents replacing hydrogen atoms on the aryl portion of the isoindoline nucleus, each $R_n$ is a hydrocarbon radical of from 1 to 4 carbon atoms (including alkylene groups), $R'_1$ and $R'_2$ are each selected from the group consisting of 5-membered heterocyclic radicals containing a —C=N— linkage in the ring and 6-membered heterocyclic radicals containing a hetero atom selected from the group consisting of oxygen, sulfur and nitrogen in addition to a —C=N— linkage in the ring. Five- and six-membered heterocyclic radicals with from 1 to 4 ring carbon atoms are suitable, with radicals containing from 3 to 4 ring carbon atoms and a total of from 3 to 20 carbon atoms in the hetero radical preferred. Examples of the compounds within the scope of the present invention include 1,3-bis-(3-isothiazoylimino)-isoindoline, 1,3-bis-(2-oxazolylimino)-isoindoline, 1,3-bis-(3-pyrazolylimino)-isoindoline, 1,3-bis-(2-imidazolylimino)-isoindoline, prepared from phthalodinitrile and 3-aminoisothiazole, 2-aminooxazole, 3-aminopyrazole, and 2-aminoimidazole, respectively. Unsymmetrical compounds such as 1-(2-pyridylimino)-3-(3-isothiazolylimino)-isoindoline and 1-(2-thiazolylimino)-3-(2-oxazolylimino)-isoindoline are also within the scope of the present invention and may be prepared (in smaller yields) by reacting mixtures of the heterocyclic amines with substituted or unsubstituted phthalodinitriles.

According to the process of the present invention, the heterocyclic primary amine and the aromatic dinitrile compound can be first mixed in the solid state and then the resulting mixture heated to form a molten reaction mass. The molten mixture is heated to a temperature sufficient to form ammonia as a reaction product. Temperatures of up to 375° C. may be used. Temperatures of from 150° C. to 300° C. have been found to give particularly good results. The reaction between phthalodinitrile and 2-aminopyridines is preferably carried out at a temperature from 180° C. to 280° C. For the reaction between phthalodinitrile and 2-aminothiazole (to produce 1,3-bis-(2'-thiazoyl)-imino-isoindoline) the reaction temperature is preferably from 200° C. to 300° C.

Another preferred embodiment of the present invention comprises first melting the reaction component with the higher melting point and then adding the second component. The second component may be added as a solid or may be melted prior to addition. The addition may be conducted continuously or batchwise. If the second reactant is added continuously to a preformed molten reaction mixture, a steady generation of ammonia is obtained and there is no risk of the reaction mixture foaming over. When conducting the reaction according to this preferred embodiment, the temperature of the molten components should be maintained at a temperature at least 10° C. higher than the melting point of the mixture obtained when the other component is added. In this manner, a temperature differential of at least 10° C. (preferably from 10° C. to 100° C.) is maintained between the final mixture after addition of the component and the initial mixture of reactants. When this method is used, the reaction sets in immediately upon the addition of the second component and may be maintained by further additions of the reactants with simultaneous removal of ammonia.

The course of the reaction can be conveniently followed by measurement of the ammonia produced in the reaction. At the end of the reaction the reaction product can be recovered in an almost pure state by pouring out the melt and subsequently pulverizing the solidified product. A perfectly pure product can, for instance, be obtained by cooling down the melt to about 100° C. and then dissolving the melt in a higher alcohol (4 or more carbon atoms) such as secondary butyl alcohol. When the resultant solution is cooled, a crystallized product of a high degree of purity is obtained.

The process by which the novel compounds of the present invention are produced has several special advantages. These advantages make the process particularly suitable for manufacturing large amounts of the imino-substituted isoindoline derivatives. According to the process of the present invention, the reaction is completed without the use of any solvent in the reaction mixture. The reactants are merely commingled in the molten state. By conducting the reaction without a solvent, it is possible to use higher reaction temperatures and thereby reduce the reaction time. Furthermore, the use of amino hydrohalide reactants is obviated. It has been found that if the dinitrile is melted with the hydrochloric acid salt of the amine, for example, then the yield of imino-substituted isoindoline is nil, whereas in the absence of HCl the yield is very high. If, for instance, phthalodinitrile is melted with the hydrochloric acid salt of 2-aminopyridine (or with the hydrochloric acid salt of 2-aminothiazole) no 1,3-bis-(2'-pyridylimino)isoindoline (or 1,3-bis-(2'-thiazolylimino)-isoindoline) is obtained. This result is especially surprising in view of the fact that ammonia is released during the reaction and HCl would be expected to act as an ammonia-binding agent.

It has been found that better yields of product may be obtained when the reaction is conducted without a solvent. This increase in yield is not due entirely to the use of elevated reaction temperatures. Table I shows the various percentage conversions which are obtained when common solvents are used in the reaction mixtures. When the process is conducted according to the present invention, however, the desired 1,3-di-imino-isoindoline derivatives are obtained in excellent yield. For example, when phthalodinitrile is melted with 2-aminopyridine at 220° C. the yields are as follows: after 10 minutes 42%, after 30 minutes 78%, after 60 minutes 90%, and after 120 minutes 95%. By comparing these figures with the figures given in Table I it is clear that with a solvent (even at a comparable reaction temperature) much lower yields are obtained.

TABLE I

*Percentage of Conversion of Phthalodinitrile and 2-Aminopyridine Into 1,3-Bis(2-Pyridylimino)-Isoindoline*

| Solvent | Reaction Temperature, °C. | Percentage of conversion after— | | | |
|---|---|---|---|---|---|
| | | 10 minutes | 30 minutes | 60 minutes | 120 minutes |
| Ethanol | 120 | | | 0 | 0 |
| Cumene | 152 | 2 | 2 | 2 | 3 |
| p-Diisopropylbenzene | 203 | 4 | 9 | 16 | 26 |
| Kerex [1] | 218 | 7 | 16 | 27 | 45 |

[1] An aromatic extract obtained from kerosene.

The 1,3-di-imino-isoindoline derivatives which are obtained by the process of the present invention, with the exception of 1,3-bis-(2'-pyridylimino)-isoindoline, are believed to be novel compounds.

The 1,3-di-imino-isoindoline compounds which are prepared according to the process of the present invention are excellent metal deactivators. These compounds are especially useful for deactivating metals present in hydrocarbons because they are not leached out of their solutions in hydrocarbons by water or by aqueous caustic solution. Furthermore, the deactivating properties of the 1,3-di-imino-isoindoline derivatives of the present invention are not adversely affected by either water or caustic solution. In addition, the compounds have high resistance to acidic aqueous solutions. These properties are especially desirable when the compounds of the present invention are employed as metal deactivators for gasoline because gasoline is frequently contaminated with water or aqueous solutions of acids or bases. The presence of such impurities in very small amounts nullifies the effect of commercial metal deactivators, but does not destroy the action of the compounds prepared in accordance with the present invention.

The following examples are submitted to further illustrate the invention but are not to be construed as limiting the scope of the invention in any way.

EXAMPLE I

Six and four-tenths parts by weight of phthalodinitrile and 11.4 parts by weight of 2-aminopyridine were combined and the mixture heated to a temperature of 200° C. The ammonia produced was collected in water. After two hours heating, the temperature varying between 210 and 230° C., the mixture, after cooling to about 100° C., was taken up in 200 parts by weight of sec. butanol heated to boiling point. The resultant solution, which still contained a small amount of undissolved reaction product, was heated on a steam bath until the product had dissolved completely and then cooled down to room temperature. The crystalline precipitate formed was filtered off, washed with little sec. butanol, dried and analyzed. The yield was 11.9 parts by weight of 1,3-bis(2-pyridylimino)-isoindoline with a melting point of 186.5–187° C., the analysis of which was as follows:

C, 72.2% w.; H, 4.5% w.; N, 23.3% w. Calculated for $C_{18}H_{13}N_5$: C, 72.2% w.; H, 4.35% w.; N, 23.4% w.

The quantity of ammonia collected was determined by titration; this amounted to 0.85 part by weight.

EXAMPLE II

One thousand two hundred eighty parts by weight of phthalodinitrile was melted, the melt heated to 200° C. and 2070 parts by weight of molten 2-aminopyridine was gradually added in the course of 35 minutes. The temperature of the molten 2-aminopyridine was 60° C. The ammonia formed in the reaction was absorbed in water via a buffer vessel. After two hours' heating to 200–230° C., during which time the mixture was occasionally stirred, no more ammonia was liberated. The melt was cooled down to 100° C., after which 35,000 parts by weight of sec. butanol was added and the mixture was stirred for two hours at boiling temperature (101° C.). It was then cooled down to room temperature, the 1,3-bis(2-pyridylimino)-isoindoline crystallizing. The product was filtered off, washed with 10,000 parts by weight of sec. butanol and dried in a vacuum drier at a temperature of 100° C. and a pressure of 8 cm. of mercury. The yield was 2560 parts by weight; the melting point was 186.5–187° C.

EXAMPLE III

*Preparation of 1,3-bis(2-thiazolylimino)-isoindoline.*—Twelve and eight-tenths parts by weight of phthalodinitrile and 20 parts by weight of 2-aminothiazole were heated together till molten, after which the molten mixture was heated for 15 minutes to 250° C. The ammonia produced was collected. The progress of the reaction was followed by determining the amount of ammonia generated as a function of time. In the following Table II the yield of desired reaction product is recorded as a function of the reaction time, the yield being calculated from the measured quantity of ammonia.

TABLE II

*Reaction of Phthalodinitrile With 2-Aminothiazole at 250° C.*

| Reaction time, min.: | Yield, Percent |
|---|---|
| 1 | 7.2 |
| 5 | 79.2 |
| 6 | 81.5 |
| 9 | 88.2 |
| 12 | 92.6 |
| 15 | 95.0 |

After fifteen minutes' heating to 250° C., the melt, which had become of a syrupy consistency, was cooled down to about 100° C., after which 9000 parts by weight of isobutanol was added. The mixture was heated to 100° C., the reaction product dissolving. After cooling to room temperature, the crystallized product was filtered off and washed with 200 parts by weight of isobutanol. The product was dried at 100° C. The yield was 28.0 parts by weight. The melting point was 277° C.; the analysis was as follows:

N, 22.6% w.; S, 20.6% w. Calculated for $C_{14}H_9N_5S_2$; N, 22.5% w.; S, 20.6% w.

I claim as my invention:

1. The compound 1,3-bis-(3-isothiazolylimino)-isoindoline.
2. The compound 1,3-bis-(2-thiazolylimino)-isoindoline.

References Cited in the file of this patent

UNITED STATES PATENTS

| 2,739,151 | Rosch et al. | Mar. 20, 1956 |
| 2,739,155 | Rosch et al. | Mar. 20, 1956 |
| 2,752,346 | Rosch et al. | June 26, 1956 |
| 2,945,861 | Baumann | July 19, 1960 |

OTHER REFERENCES

Morton: The Chemistry of Heterocyclic Compounds (New York, 1946), page 362–4. QD400 M65.

Clark et al.: J. Chem. Soc., pp. 3593–3601 (1953).